United States Patent
Nogle

[11] Patent Number: 5,941,270
[45] Date of Patent: Aug. 24, 1999

[54] BUTTERFLY TYPE TWO-WAY CHECK VALVE FOR AN AUTOMATIC TRANSMISSION

[75] Inventor: Thomas D. Nogle, Troy, Mich.

[73] Assignee: Chrysler Corporation, Auburn Hills, Mich.

[21] Appl. No.: 08/975,094

[22] Filed: Nov. 20, 1997

[51] Int. Cl.[6] .................................................. F16K 11/052

[52] U.S. Cl. .......................... 137/112; 74/733.1; 137/513

[58] Field of Search .................................. 137/112, 513; 74/733.1, 732.1

[56] References Cited

U.S. PATENT DOCUMENTS

| | | | |
|---|---|---|---|
| 1,789,855 | 1/1931 | White et al. | 137/513 X |
| 2,017,033 | 10/1935 | McGuffin | 137/513 |
| 2,161,813 | 6/1939 | Groeniger | 137/513 X |
| 4,996,894 | 3/1991 | Holbrook et al. | 74/733.1 |

*Primary Examiner*—Stephen M. Hepperle
*Attorney, Agent, or Firm*—Kenneth H. Maclean

[57] ABSTRACT

An improved two-way check valve for controlling the flow of fluid to an element from either one of a pair of hydraulic sources in a hydraulic automatic transmission, the check valve having a flow cavity in which a pivotal flapper valve is mounted so as to alternately cover one of two inlet openings to the cavity.

10 Claims, 2 Drawing Sheets

BUTTERFLY TYPE TWO-WAY CHECK VALVE FOR AN AUTOMATIC TRANSMISSION

FIELD OF INVENTION

This invention relates generally to fluid control in an automatic transmission for a vehicle and specifically to a flapper type two-way check valve which is used to actuate a hydraulic component such as a clutch or spool valve by either of two fluid inputs, sometimes by both inputs.

BACKGROUND AND SUMMARY OF THE INVENTION

Most current hydraulic transmissions use one or more two-way check valves for directing hydraulic pressure from either of two fluid sources to a hydraulically actuated component, such as a clutch, band, or spool valve. Hydraulic pressure is used in such a component to achieve and maintain some transmission function, such as a particular gear ratio. There are hydraulic elements (clutches or bands) corresponding to each gear ratio. The transmission shifts between different gear ratios by activation/deactivation of such elements. Activation of an element is accomplished when hydraulic pressure is directed to a particular element, typically by positioning one or more spool type valves or by direct control of the fluid by use of a solenoid actuated valve.

Previously, the spool valve was positioned by selection of a desired shift range by the vehicle operator, such as a selection of DRIVE, and another signal such as vehicle speed, throttle position, or engine manifold vacuum. Such a condition is common in current transmissions although in many modern transmissions a particular functional selection, such as OVERDRIVE or 2nd GEAR, may also be electronically selected under certain driving and loading conditions. Thus, there often are two hydraulic pressure sources for any one particular responding component. It is normally desirable to actuate such an element (such as a clutch) by only one of the two pressure sources at a time for consistency of control, but sometimes two sources are used together (in parallel) to achieve faster actuation.

Current two-way check valves utilize a spherical ball loosely contained in a cavity formed in the transmission's valve housing. The cavity has a pair of inlets and an outlets. Each inlet has seat portions or edges of an aperture against which the ball seats when in a closed operative position relative to that inlet. As the fluid enters at one inlet, the ball responds by moving to block the other inlet which is at a lower pressure. Consequently, the ball may have to move a relatively long distance into contact with the low pressure valve seat. Further, since the ball is traveling transversely to the seat, its inertia is likely to cause the ball to rebound therefrom and also to orbit or rotate relative to the seat. Either condition is undesirable because these characteristics cause slow and erratic performance and often result in relatively high by-pass leakages in addition to the by-pass leakage occurring during the period while the ball moves between the two seats and both inlets are open. Consequently, the lower-pressure inlet undesirably becomes a temporary outlet. A coordinated or synchronous opening and closing is desired. As the ball must move a relatively great distance and has high mass, the performance is poor and the associated transmission function may not be as consistent, or positive as possible. Also, at relatively low fluid flow rates, the ball responds poorly and often will not quickly or adequately seat and therefore seal an inlet. And because of the mass of the ball and its large shape, the flow rate suffers as the large ball does not get out of the way of the flow very quickly or efficiently. Further, the use of a ball type check valve restricts the inlet port to a circular shape and to a small diameter limited by the diameter of an associated ball which can be housed. Finally, the durability of a ball in this type of check valve is often marginal, especially if the inlet seat edge conditions are not well controlled and formed.

The subject application provides an improved two-way check valve which eliminates the previously used ball valve element. Instead, a onepiece flapper valve is provided. The flapper valve is generally V-shaped and formed with a crease or edge at a midposition. A pair of flat arm portions extend from the midportion away from the crease. In a transmission cavity, the creased portion supported between a pair of inlets and their seat portions. As the V-shaped valve element pivots about the crease, a surface of one of the arms covers one of the inlets and a surface of the other arm is raised away from the other inlet and its seat. Due to the V-shape, as one arm is forced away from its associated inlet seat, the other arm moves directly toward its associated inlet seat. This provides a coordinated and synchronous operation of the two ports. Further, the arm portions do not restrict the inlets to a relatively small circular shape. In addition, the thin arm portions have a low mass and are capable of rapid movement between opened and closed positions. The low mass, large area flapper valves also react desirably and positively in response to low flow rates. Also, the arm portions need only travel a short distance which increases the responsiveness of the check valve. Further, the arm portions contact a relatively large area of easily controlled surface quality about the inlet seats to enhance durability and provide desired positive sealing without rebound or orbiting as was common with ball valves.

Other features, objects, and advantages of the invention will become more apparent as the following description proceeds, especially when considered with the accompanying drawings and claims.

DETAILED DESCRIPTION OF THE PREFERRED EMBODIMENT

Figure 1:
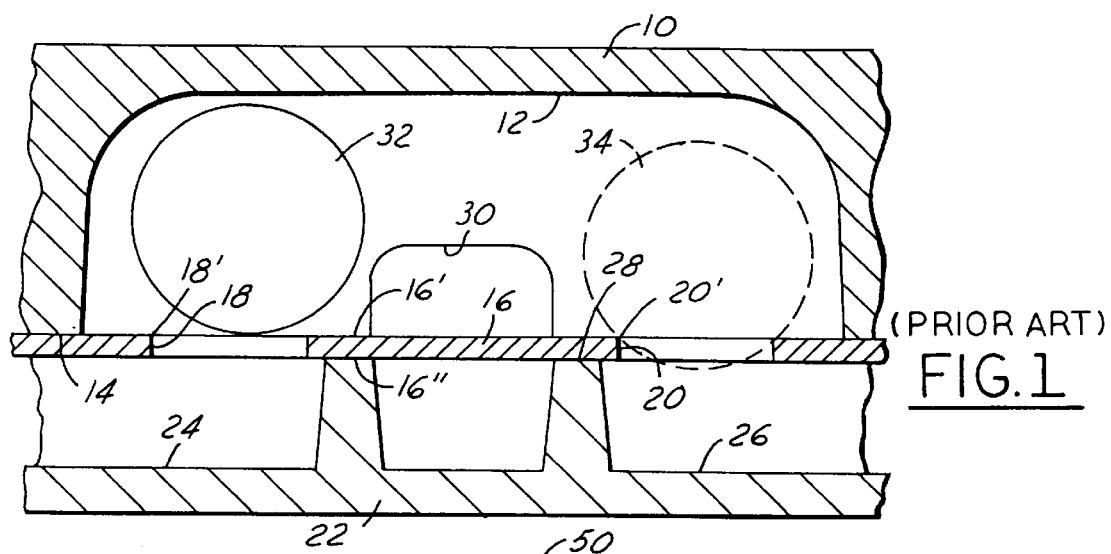
FIG. 1 is a sectioned elevational view of a prior art ball type two-way check valve.

In FIG. 1, a prior art ball type two-way check valve is illustrated in side elevation. A housing for the check valve is provided by a portion 10 of a transmission wall member. Specifically, the portion 10 has a pocket or cavity 12 formed therein extending away from a surface 14. Surface 14 engages a surface 16' of a thin valve seat forming member 16. A pair of apertures 18, 20 are formed through the thin valve seat forming member 16 into cavity 12. Another portion 22 of another transmission wall member has two pockets or cavities 24, 26 formed therein extending away from a surface 28. The surface 28 engages an opposite side 16" to side 16' of a thin valve seat forming member 16. An outlet opening 30 extends from the pocket or cavity 12.

Each aperture 18, 20 has a circular peripheral edge 18', 20', respectively, which forms a seat for a ball valve element 32 which is loosely contained in cavity 12. The dotted line representation 34 of the ball shows the extent of movement necessary for it to interact alternately with the two inlets 18, 20. As previously explained, two sources of hydraulic pressure are associated with each of the pair of apertures 18, 20. The outlet 30 is fluidly connected to a component such as a clutch. As pressurized fluid is applied to one of the inlet apertures, say inlet 18, the ball 32 in FIG. 1 responds by moving to the dotted line position 34 where it seats against surface or edge 20'. This permits fluid to flow through inlet aperture 18 through cavity 12 and out through outlet aperture 30 to the associated hydraulic component or clutch.

Figure 2:
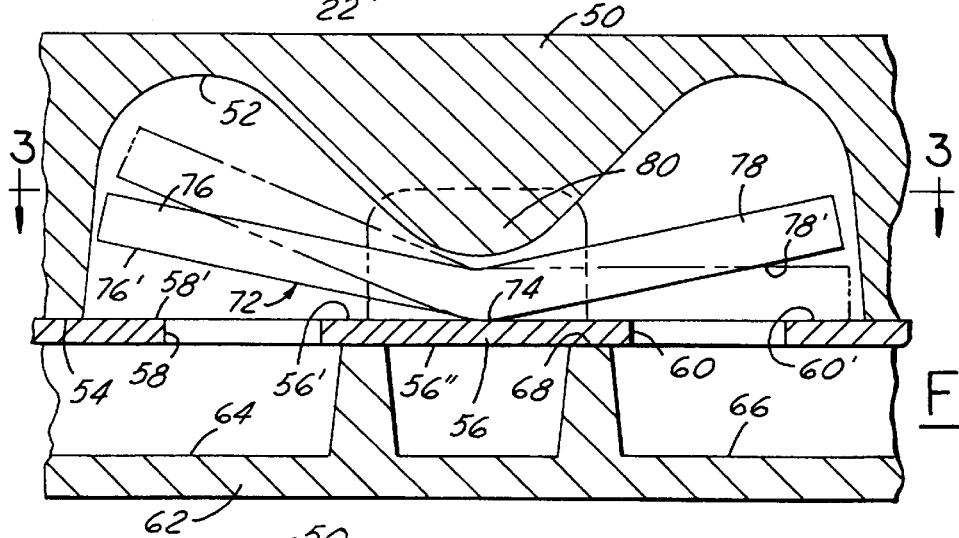
FIG. 2 is a sectioned elevational view of a first embodiment of the subject flapper type two-way check valve.
Figure 3:
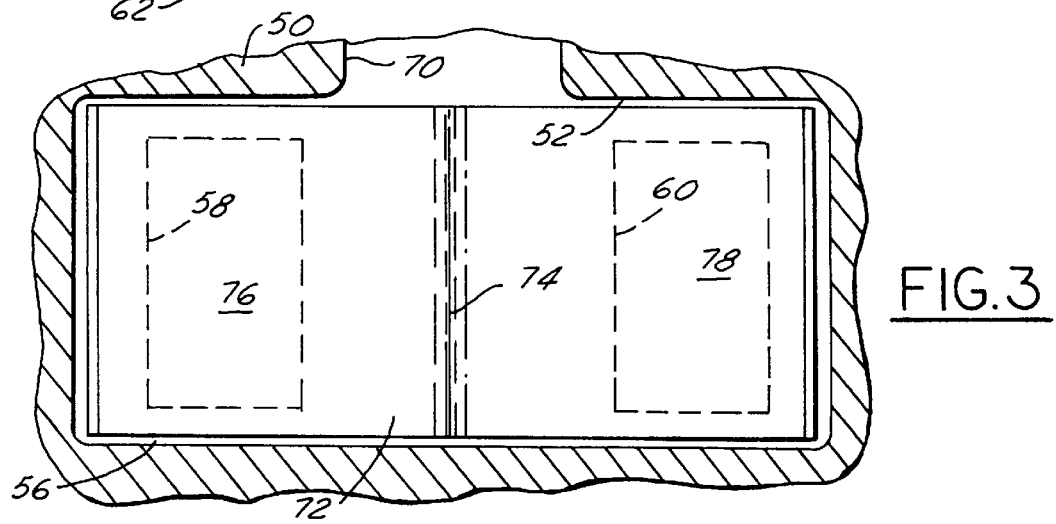
FIG. 3 is a sectioned planar view of the first embodiment of the subject flapper type two-way check valve.

In FIGS. 2 and 3, a first embodiment of the subject flapper type two-way check valve is illustrated. The housing for the check valve is provided by wall portion 50 of a transmission member, typically of die injection molded aluminum. Specifically, the wall portion 50 has a pocket or cavity 52 formed therein extending away from a surface 54. Surface 54 engages a surface 56' of a thin inlet aperture and valve seat forming member 56. Member 56 is most conveniently made of steel plate. A pair of inlet apertures 58, 60 extend through the member 56 into cavity 52. Another wall portion 62 of another transmission member, also of aluminum, has two pockets or cavities 64, 66 formed therein extending away from a surface 68. The surface 68 engages a side 56" opposite to side 56' of member 56. An outlet opening 70 extends from the pocket or cavity 52.

Each aperture 58, 60 has a peripheral seat surface 58', 60', respectively, which encircles the aperture and positively and immediately acts with the valve as it closes to block flow through the aperture. A generally V-shaped flapper valve 72 is supported within cavity 52. In a preferred embodiment, the valve 72 is molded of plastic or rubber, or it might be a metal stamping. Specifically, the flapper valve 72 has a creased midportion 74 and a pair of substantially flat arm portions 76, 78 extending therefrom. Underside flat surfaces 76', 78' of respective arm portions 76, 78 overlie the seat surfaces 58', 60'. In response to pivotal movements of the flapper valve 72 about its creased midportion 74, the surfaces 76', 78' engage the surfaces 58', 60', respectively. The wall portion 50 which forms the cavity 52 is shaped to provide a curved fulcrum portion 80 which is spaced closely to the creased portion 74 so that the flapper valve may momentarily bear against the fulcrum to permit pivotal movement thereabout. In FIG. 2, the flapper valve 72 is shown in a neutral or mid-position but normally it would be either in the dotted line position rotated clockwise and closing inlet aperture 60 as shown or rotated counterclockwise from the mid-position and closing inlet aperture 58. Specifically, the pivoting movement of the valve causes an undersurface 76' or 78' to engage a respective seat surface 58' or 60'.

As with the previous explanation relating to the valve shown in FIG. 1, two sources of hydraulic pressure are associated with each of the pair of apertures 58, 60. The outlet 70 is fluidly connected to a component such as a clutch. As the pressure of fluid is elevated at one inlet over the pressure at the other inlet, the flapper valve 72 responds by pivoting so that an arm seats against a seat surface. Thus, an increase of pressure at inlet 58, for example, will cause clockwise pivotal movement of the valve 72 so that surface 78' of arm 78 will close inlet aperture 60. This permits flow through inlet aperture 58, through cavity 52 and out through outlet aperture 70 to the associated hydraulic component or clutch.

Figure 4:
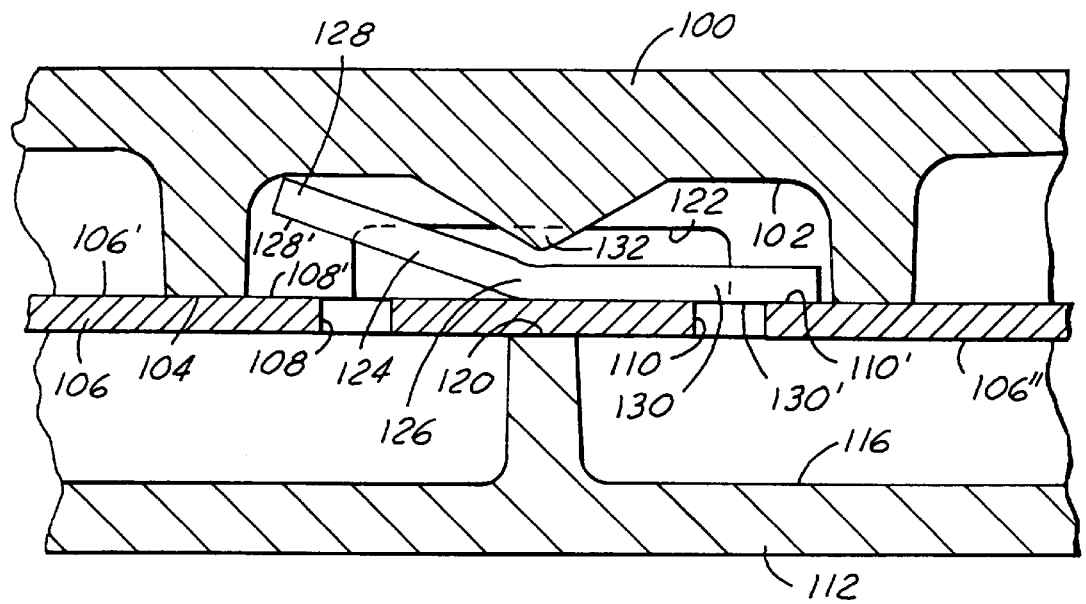
FIG. 4 is a side elevational view of a second embodiment of the subject flapper type two-way check valve.

In FIG. 4, a second embodiment of the subject flapper type two-way check valve is illustrated. A housing for the check valve is provided by a wall portion 100 of a transmission member. Specifically, the portion 100 has a pocket or cavity 102 formed therein extending away from a surface 104. Surface 104 engages a surface 106' of a thin inlet aperture and valve seat forming member 106. A pair of apertures 108, 110 are formed through the member 106 into cavity 102. Another wall portion 112 of another transmission member has two pockets or cavities 116, 118 formed therein extending away from a surface 120. The surface 120 engages a surface 106" opposite to side 106' of member 106. An outlet opening 122 extends from the cavity 102.

Each aperture 108, 110 has a peripheral seat surface 108', 110', respectively, which immediately surrounds the aperture. A generally V-shaped flapper valve 124 is supported within the cavity 102. Specifically, the flapper valve 124 has a creased portion 126 along its midportion and a pair of flat arm portions 128, 130 extending therefrom. The underside surfaces 128', 130' of respective arm portions 128, 130 overlie the seat surfaces 108', 110' and are engaged thereby in response to pivotal motion of the flapper valve 124 about its creased midportion 126. The wall portion 100 which forms the cavity 102 is shaped to provide a curved fulcrum portion 132 which is spaced closely to the creased portion 126 so that the flapper valve may bear against the fulcrum to permit pivotal movement thereabout. The flapper valve is shown in its clockwise rotated position in FIG. 4 in which inlet aperture 110 is closed. Valve 124 is capable of pivotal rotation to a counterclockwise position in which inlet aperture 108 is covered and closed. The pivoting movement of the valve causes an undersurface 128', 130' to engage a seat surface 108', 110', respectively. The clockwise position of the flapper valve shown in FIG. 4 would correspond to application of an elevated pressure at inlet aperture 108 and this would cause inlet aperture 110 to be closed.

As with the previous explanations relating to the valve shown in FIGS. 2 and 3, two sources of hydraulic pressure are associated with each of the pair of inlet apertures 108, 110. The outlet 102 is fluidly connected to a component such as a clutch. As the pressure of fluid is elevated at one inlet over the pressure at the other inlet, the flapper valve 124 responds by pivoting so that an arm seats against a seat surface. Thus, an increase of pressure at inlet 108, for example, will cause clockwise pivotal movement of the valve 124 so that surface 130' of arm 130 will close inlet aperture 110. This permits flow through inlet aperture 108, through cavity 102 and out through outlet aperture 122 to the associated hydraulic component or clutch.

Figure 5:
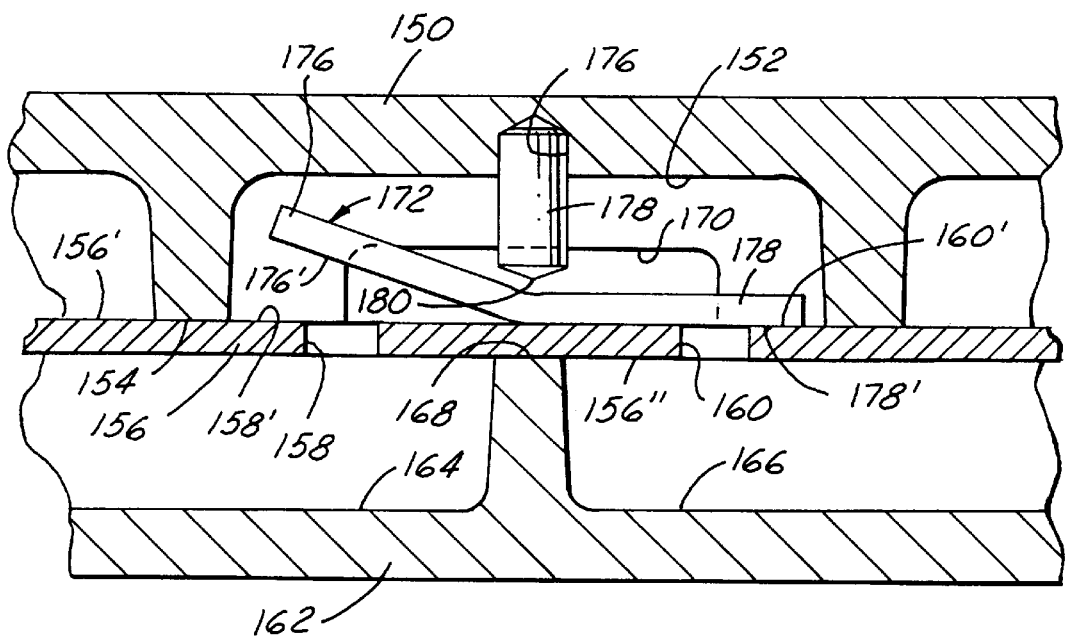
FIG. 5 is a side elevational view of a third embodiment of the subject flapper type two-way check valve.

In FIG. 5, a third embodiment of the subject flapper type two-way check valve is illustrated. A housing for the check valve is provided by a wall portion 150 of a transmission member. Specifically, the wall portion 150 has a pocket or cavity 152 formed therein extending away from a surface 154. Surface 154 engages a surface 156' of a thin inlet aperture and valve seat forming member 156. A pair of apertures 158, 160 are formed through the member 156 into cavity 152. Another wall portion 162 of another transmission member has two pockets or cavities 164, 166 formed therein extending away from a surface 168. The surface 168 engages a side 156" opposite to the side 156' of member 156. An outlet opening 170 extends from the pocket or cavity 152.

Each aperture 158, 160 has a peripheral seat surface 158', 160', respectively, which encircles the aperture. A generally V-shaped flapper valve 172 is supported within the cavity 152. Specifically, the flapper valve 172 has a creased portion 174 along its midportion and a pair of flat arm portions 176, 178 extending therefrom. The underside surfaces 176', 178' of respective arm portions 176, 178 overlie the seat surfaces 158', 160' and are engaged thereby in response to pivotal motion of the flapper valve 172 about its creased midportion 174. The transmission wall portion 150 which forms the cavity 152 has a bore 176 therein which receives one end of a pivot pin member 178, preferably of steel, which extends downward into the cavity toward the valve 172. The lower end portion 180 is shaped to provide a point-fulcrum which is spaced closely to the creased portion 174 so that the flapper valve may bear against the fulcrum to permit pivotal movement thereabout.

The flapper valve 172 is shown in a clockwise rotated position in FIG. 5 in which inlet aperture 160 is closed. Valve 172 is capable of pivotal rotation to a counterclockwise position in which inlet aperture 158 is covered and closed. The pivoting movement of the valve causes an undersurface 176', 178' to engage a seat surface 158', 160', respectively. The clockwise position of the flapper valve shown in FIG. 4 would correspond to application of an elevated pressure at inlet aperture 158 and this would cause inlet aperture 160 to be closed.

As with the previous explanations relating to the valve shown in FIGS. 2, 3, and 4, two sources of hydraulic pressure are associated with each of the pair of inlet apertures 158, 160. The outlet 152 is fluidly connected to a component such as a clutch. As the pressure of fluid is elevated at one inlet over the pressure at the other inlet, the flapper valve 172 responds by pivoting so that an arm seats against a seat surface. Thus, an increase of pressure at inlet 158, for example, will cause clockwise pivotal movement of the valve 172 so that surface 178' of arm 178 will close inlet aperture 160. This permits flow through inlet aperture 158, through cavity 152 and out through outlet aperture 170 to the associated hydraulic component or clutch.

While the above detailed description describes the preferred embodiment of the present invention, the invention is susceptible to modification, variation and alteration without deviating from the scope and fair meaning of the subjoined claims.

What is claimed is:

1. In a transmission of the type having a pump for pressurizing a working fluid, a fluid pressure activated component having a fluid inlet, selective means for directing pressurized fluid to the inlet of the fluid pressure activated component through alternative paths, and a two-way check valve between the selective means and the fluid pressure activated component for controlling the application of pressurized fluid, comprising:
   a check valve housing defining a hollow flow cavity, a pair of spaced inlets into said cavity, and an outlet from said cavity;
   a valve element supported in said cavity having a pair of arm portions extending from a midportion in opposite directions, each arm portion having a substantially flat valve surface extending close to one of said inlets;
   each valve surface of said arms extending in a plane which is non-parallel to the plane of the other surface so that one valve surface can overlie an associated inlet thus closing that inlet while the other valve surface is spaced from said other inlet thus allowing fluid to flow therethrough into said cavity;
   support means for the valve element allowing it to pivot between a first position in which one inlet is closed by an associated valve surface and the second inlet is opened and a second position in which the one inlet is opened and the second inlet is closed.

2. In a transmission of the type having a pump for pressurizing a working fluid, a fluid pressure activated component having a fluid inlet, selective means for directing pressurized fluid to the inlet of the fluid pressure activated component through alternative dual fluid paths, and a two-way check valve between the selective means and the fluid pressure activated component for controlling application of pressurized fluid, comprising:
   a check valve housing means defining a hollow flow cavity, a pair of spaced inlets to said cavity, each inlet operatively connected to the selective means for receiving pressurized fluid, and an outlet from said cavity operatively connected to the fluid pressure activated component;
   a flapper valve supported in said cavity and having oppositely directed arm portions each with a substantially flat valving surface adapted to extend over one of said inlets;
   said flapper valve being constructed so as to cause one of the valving surfaces of one arm portion to cover an associated inlet thus closing said inlet while the second valving surface of the other arm portion is spaced away from an associated inlet thus opening said inlet for flow into said cavity;
   means to allow said flapper valve to move back and forth between alternate positions in which one inlet is opened and the second inlet is closed and in which the one inlet is closed and the second inlet is opened.

3. The two-way check valve as set forth in claim 2 in which the flapper valve has substantially a V-shaped configuration defined by a crease formation extending along a midposition, said flapper valve supported along a line contact between said flapper valve and said housing defined by said crease formation whereby said flapper valve can pivot along said line contact.

4. The two-way check valve as set forth in claim 3 in which said line contact between said creased formation and said housing extends between said inlets thereby causing said oppositely directed arm portions to extend over said inlets.

5. The two-way check valve as set forth in claim 3 in which said check valve housing provides a formation extending into said cavity and terminating in closely spaced relation to said crease formation to inhibit movement of said crease formation away from its line contact with the housing and thereby serving as a fulcrum about which said flapper valve pivots.

6. In a hydraulically operated transmission for a vehicle of the type having a pump for pressurizing a working fluid, a fluid pressure activated component having a fluid inlet, selective means for directing pressurized fluid to the inlet of the fluid pressure activated component through alternative dual fluid paths, and a two-way check valve between the selective means and the fluid pressure activated component for controlling application of pressurized fluid, comprising:
   a check valve housing means defining a hollow flow cavity, a pair of spaced inlets to said cavity, each inlet operatively connected to the selective means for receiving pressurized fluid, and an outlet from said cavity operatively connected to the fluid pressure activated component;

a valve element in the form of a substantially thin plate member, said plate member having a crease formation therein, a pair of oppositely directed arm portions extending in non-parallel planes away from said crease formation thus defining a generally V-shaped configuration;

means supporting said valve element in said cavity including a line contact between said crease formation and said valve housing each of said arm portions defining a generally flat valve surface adapted to extend over an inlet;

means to allow said flapper valve to pivot between alternate positions in which one inlet is opened and the second inlet is closed and in which the one inlet is closed and the second inlet is opened, whereby when fluid at an elevated pressure level is directed to an inlet, the valve element rapidly pivots to permit fluid to flow through that inlet while closing the other inlet at a lower pressure level.

7. The two-way check valve as set forth in claim 6 in which the valve has substantially a V-shaped configuration defined by a crease formation extending along a midposition, said valve supported along a line contact between said flapper valve and said housing defined by said crease formation whereby said valve can pivot along said line contact.

8. The two-way check valve as set forth in claim 7 in which said line contact between said creased formation and said housing extends between said inlets thereby causing said oppositely directed arm portions to extend over said inlets.

9. The two-way check valve as set forth in claim 7 in which said check valve housing provides a formation extending into said cavity and terminating in closely spaced relation to said crease formation to inhibit movement of said crease formation away from its line contact with the housing and thereby serving as a fulcrum about which said valve pivots.

10. The two-way check valve as set forth in claim 9 in which said fulcrum is provided by a pin member supported by the housing in said cavity and having an end portion which terminates closely adjacent to said crease formation of said valve element.

* * * * *